No. 758,267. Patented April 26, 1904.

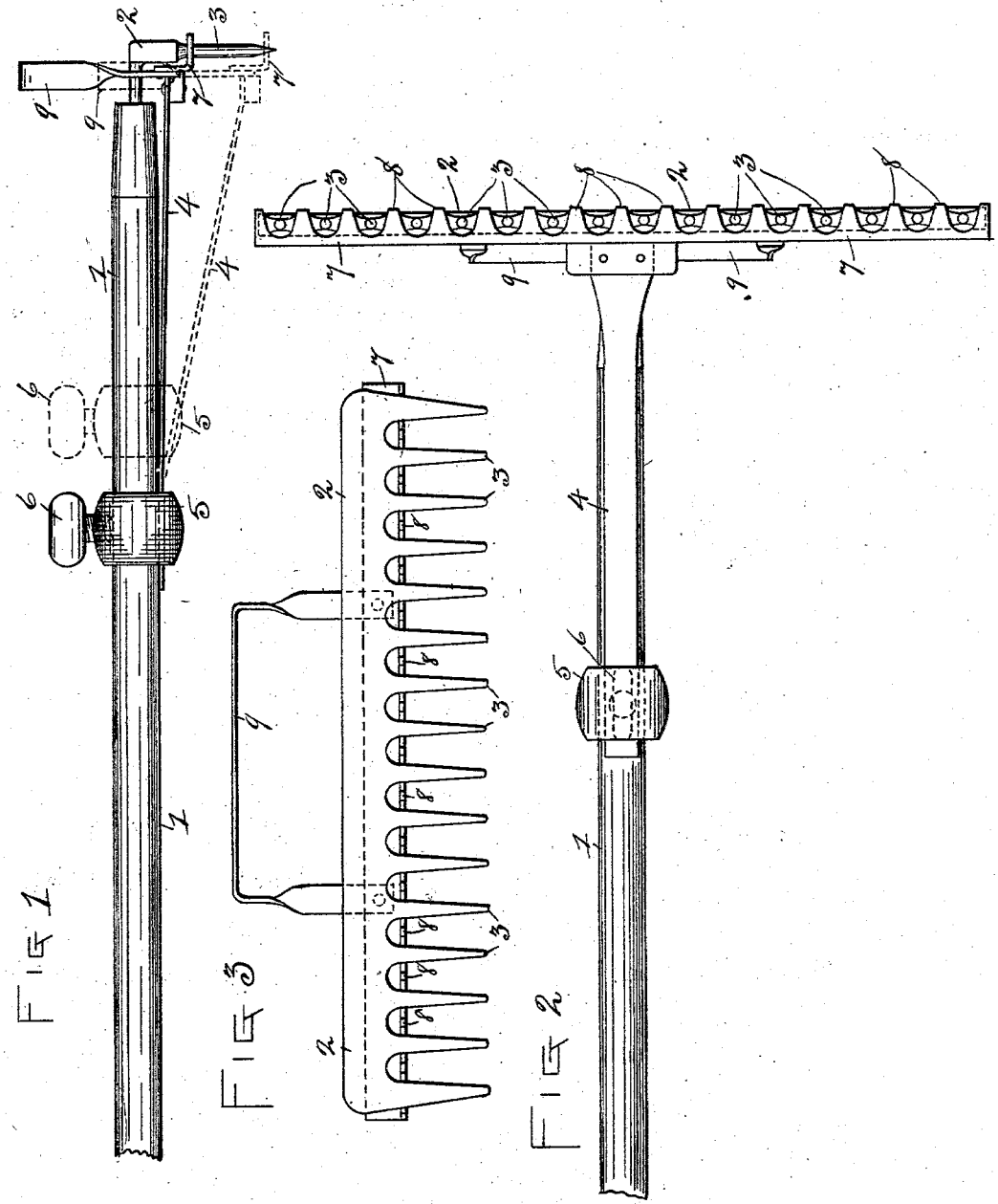

UNITED STATES PATENT OFFICE.

JOHN MORRISON, JR., OF TROY, NEW YORK, ASSIGNOR TO JOHN MORRISON, OF TROY, NEW YORK.

SELF-CLEARING RAKE.

SPECIFICATION forming part of Letters Patent No. 758,267, dated April 26, 1904.

Application filed August 27, 1902. Serial No. 121,209. (No model.)

*To all whom it may concern:*

Be it known that I, JOHN MORRISON, Jr., a citizen of the United States, residing at Troy, county of Rensselaer, and State of New York, have invented certain new and useful Improvements in Self-Clearing Rakes, of which the following is a specification.

The invention relates to such improvements; and it consists of the novel construction and combination of parts hereinafter described and subsequently claimed.

Reference may be had to the accompanying drawings, and the reference characters marked thereon, which form a part of this specification.

Similar characters refer to similar parts in the several figures.

Figure 1 of the drawings is a view in side elevation of my improved self-clearing rake. Fig. 2 is a bottom plan view of the same. Fig. 3 is a view in front elevation of the same.

The object of my invention is to provide for the quick and effective removal of accumulations of leaves and grass upon and between the teeth of an ordinary rake, as a garden-rake, hay-rake, or the like.

Referring to the drawings, 1 represents the handle, 2 the head, and 3 the teeth, of an ordinary garden-rake.

4 is a spring-plate comprising a strip of resilient metal secured at its inner end to the under side of the rake-handle, preferably on the under side thereof, as by means of the clip 5 embracing and securing together said handle and the inner end of the resilient strip and adjustably secured by means of the thumb-screw 6. Upon the outer end of this spring-plate is fixedly mounted a clearing-plate 7 in proximity to the teeth of the rake and preferably having teeth 8, adapted to intermesh with the teeth of the rake.

The clearing-plate is shown provided with a yoke-shaped member 9, fixed thereupon to inclose the rake-handle and projecting upwardly above the head of the rake.

In operation the rake is used in the ordinary manner until it is desired to operate the clearing mechanism, whereupon the clearing-plate is forced downwardly along the teeth of the rake against the force of the spring-plate 4 by means of the yoke member 9, which yoke member can be depressed by hand, if desired. The construction permits, however, of the easy operation of the clearing-plate by forcing the yoke member 9 against any stationary object.

The device can be operated when desired by inverting the rake and its attachments and forcing the yoke member into engagement with the ground. The clearing-plate can thus be operated to cause its teeth to move longitudinally along the teeth of the rake, serving to strip therefrom accumulations of leaves, grass, and other matter which gathers upon or between the rake-teeth.

The movement of the clearing-plate is indicated by dotted lines in Fig. 1.

By providing the clearing-plate with teeth adapted to fit more or less loosely between the teeth of the rake I am able to adapt the device to rakes having teeth of different sizes.

The clip 5 is adjustable along the handle of the rake, permitting its attachment to and removal from the handle, as well as permitting its adjustable movement to locate the clip at different distances from the outer end of the spring-plate 4, whereby the degree of resiliency exerted by said plate can be varied as desired. I have indicated by dotted lines in Fig. 1 a position of said clip considerably nearer the outer end of the spring-plate than the clip shown by solid lines, in which position the resilient force of the spring-plate would be considerably increased.

What I claim as new, and desire to secure by Letters Patent, is—

The combination with a rake; of a spring-plate; an adjustable clip embracing and securing together the rake-handle and inner end of said spring-plate; a clearing-plate mounted on the outer end of said spring-plate; and a plate-operating member projecting above the rake-head, substantially as described.

In testimony whereof I have hereunto set my hand this 19th day of August, 1902.

JOHN MORRISON, JR.

Witnesses:
MILFORD L. FANCHER,
GEO. A. MOSHER.